TWISTER AND METHOD OF TWISTING

Original Filed June 22, 1970 2 Sheets-Sheet 1

INVENTORS
RICHMOND T. LEESON
HANS H. RICHTER
BY Albert P. Davis
Burnett W. Morton
ATTORNEYS

TWISTER AND METHOD OF TWISTING

Original Filed June 22, 1970 2 Sheets-Sheet 2

INVENTORS
RICHMOND T. LEESON
HANS H. RICHTER
BY Albert P. Davis
Burnett W. Morton
ATTORNEYS United States Patent Re. 28,409
Reissued May 6, 1975

28,409

TWISTER AND METHOD OF TWISTING

Richmond T. Leeson, East Greenwich, and Hans H. Richter, Warwick, R.I., by Leesona Corporation, Warwick, R.I., assignee Original No. 3,668,855, dated June 13, 1972, Ser. No. 48,167, June 22, 1970. Application for reissue May 4, 1973, Ser. No. 357,244
Int. Cl. D02g *1/02, 1/04*
U.S. Cl. 57—77.4 27 Claims

Matter enclosed in heavy brackets [ ] appears in the original patent but forms no part of this reissue specification; matter printed in italics indicates the additions made by reissue.

ABSTRACT OF THE DISCLOSURE

Method and apparatus are disclosed for imparting false twist to textile strand wherein a plurality of turns of twist are imparted to the strand for each revolution of a friction twister. The disclosed friction twister comprises a single hollow spindle having a pair of oppositely positioned frictional engagement means therein. The twister also includes reversing guide means which allow the strand to enter in a substantially rectilinear path through one end of the axial bore of the spindle, come into engagement with a first one of the frictional engagement means to twist the yarn, pass through the reverse guide means, thereafter contact the second of the frictional engagement means, and finally exit in a generally rectilinear path through a second end of the axial bore of said spindle. In practice with the present invention a single strand or a plurality of strands can be twisted by the use of a single friction twister spindle and a plurality of turns of twister are inserted in the strand or strands for each single revolution of the twister spindle.

BACKGROUND OF THE INVENTION

The present invention relates to improvements in commonly assigned co-pending U.S. Patent application Ser. No. 25,559.

FIELD OF THE INVENTION

The present invention relates to a strand twister and a method of utilizing said twister. More particularly, the invention relates to a friction twister for false twisting a textile strand or a plurality of strands and the method of employing said friction twister. As used herein, the term "strand" means any kind of strandular material capable of receiving twist.

DESCRIPTION OF THE PRIOR ART

In commonly assigned co-pending U.S. Patent application Ser. No. 25,559, there is disclosed and claimed a method for imparting twist to textile strands and a friction twister therefor. In practice with the invention of the cited application a plurality of turns of twist are imparted to the strand or strands for each revolution of the friction twister. The twister disclosed in this prior application includes two hollow spindles each of which carries frictional engagement means therein. The strand is threaded through each spindle in sequence, a reversing guide being provided to guide the yarn in a suitable path from one spindle to the other, and as the spindles are driven, the yarn is engaged by frictional engagement means in each the spindle and a plurality of turns of twist is inserted in the strand for each revolution of the spindles of the friction twister.

While the method and apparatus set forth in prior cited application Ser. No. 25,559, is admirably suited for imparting multiple turns of twist into the strand for each revolution of the dual spindles therein and for attaining the further advantages as set forth in said application, it has now been discovered that friction twisting of strands to obtain results akin to those set forth in the prior cited patent application may be achieved by the use of a friction twister having a single spindle.

SUMMARY OF THE INVENTION

Accordingly, the present invention comprises method and apparatus for imparting false twist to a running textile strand. In the instant invention the strand enters the hollow bore of a twister spindle and is drawn over a friction means whereafter the course of the strand is reversed by means of a reversing guide, and the strand is sequentially drawn over a second friction means in an opposite end of the twister spindle. Thereafter the yarn is directed once again upwardly through the hollow twister spindle and carried out an exit end thereof.

One object of the present invention is to provide a friction twister which is capable of false twisting a textile strand by means of frictional engagement of the strand with two separate frictional surfaces within a single rotatable spindle.

Another object of the present invention is to provide a friction twister which is capable of simultaneously false twisting a plurality of separate textile strands.

Another object of the present invention is to provide a friction twister wherein a single rotating spindle in combination with a reversing guide is provided to effect twisting of the strand, the spindle having two separately displaced frictional surfaces within the twister and the spindle being arranged for rectilinear entry of the strand thereinto from a heater-twisting zone and rectilinear exit of the strand of a feeding means.

Still a further object of the invention is to provide a friction twister having two oppositely displaced frictional twisting surfaces therein for engagement with a strand to impart false twist therein, the frictional twisting surfaces being readily replaceable.

Yet another object of the present invention is to provide a friction twister which is easily threaded.

Other objects of the invention will in part be obvious and will in part appear hereinafter.

DESCRIPTION OF THE PREFERRED EMBODIMENT

Figure 1:
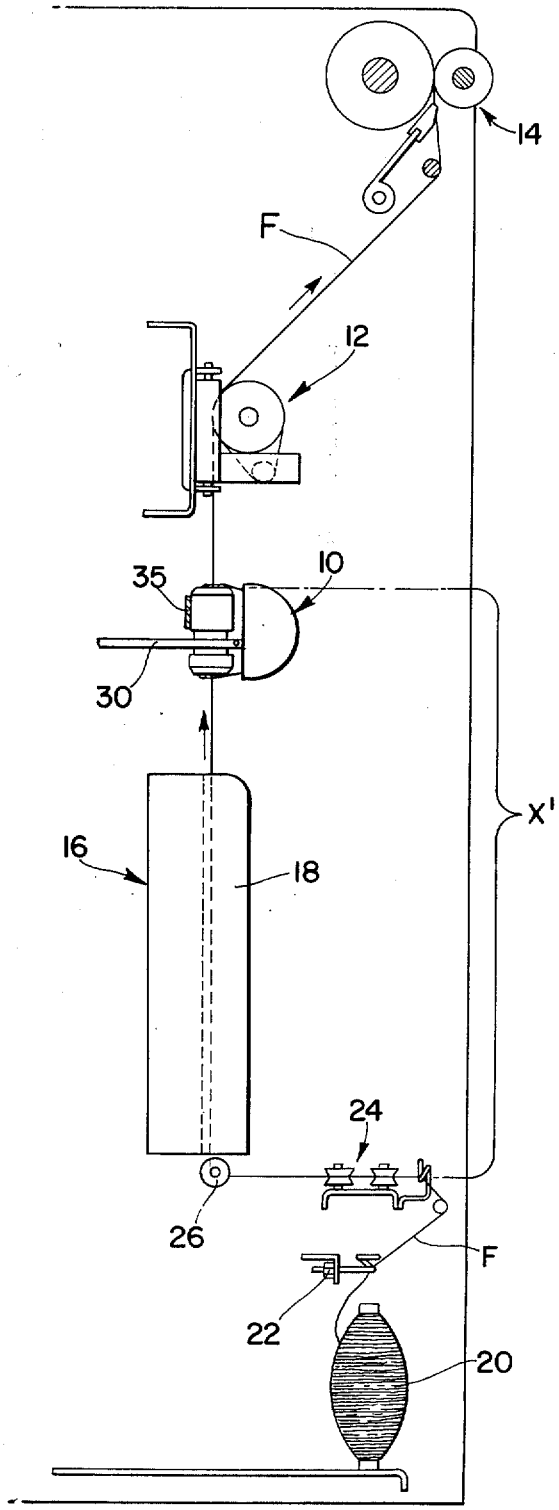
FIG. 1 is a transverse sectional view through multi-station strand processing apparatus embodying the strand false twister of the present invention.
Figure 2:
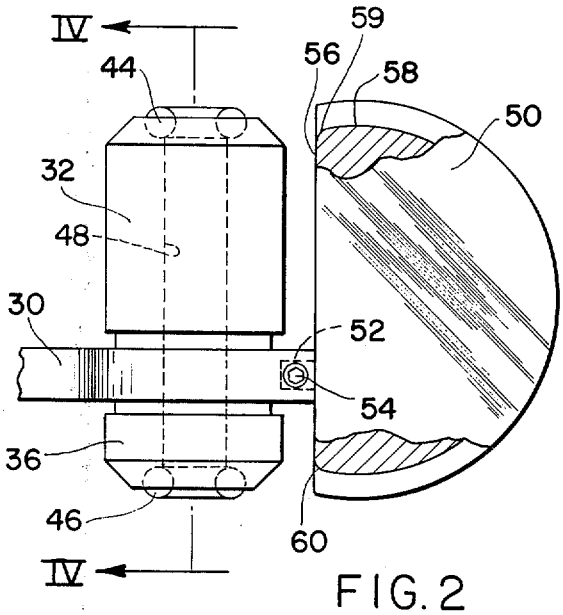
FIG. 2 is an enlarged elevational view of the friction twister of the present invention in operative association with a portion of its mounting swing.

The friction twister of the present invention is suitable for use in any apparatus wherein one or more strands are drawn from a suitable supply source or supply sources and directed along a path for false twisting and ultimate take-up on a winding form. In FIG. 1 the invention is illustrated in conjunction with apparatus comprising a conventional false twist machine for texturing strandular material. Characteristically, such false twist machines include a plurality of similar strand processing stations arranged in side-by-side relationship along a common frame. Although such machines include a plurality of individual stations it will suffice to describe but one of these stations, it being understood that the other stations are identical to the one being described. Thus, turning now to FIG. 1, each station comprises a false twister 10, operable to rotate at a speed commensurate with the rate of travel of strand F therethrough. Twister 10 operates to twist the strand below the twister and to untwist the strand thereabove. The untwisted strand from the twister 10 is passed around a tension controlling feed roll device 12 and from there to a processed strand take-up unit 14, positioned above device 12.

A heating and twisting zone underlies twister 10 and includes an elongated strand heating unit 16 common to all of the stations along the machine, the heating unit being heated by suitable heating elements not shown. The heating unit 16 has a groove or slot 18 in alignment with each twister 10. As illustrated, the strand from supply package 20 is passed upwardly toward the heating unit 16, and through suitable guide 22 and a disc tension 24 which isolates the supply package from the remainder of the apparatus. By such isolation variations in tension occasioned by the unwinding of the strand F from package 20 is controlled as the yarn passed through the tension disc. A lower, positively driven feed roll 26 is provided at the lower end of the heater to cooperate with upper feed roll device 12 to control strand tension in the heating and twisting zone.

In operation with the apparatus described to this point strand F is drawn off package 20, advanced through guide 22, tension discs 24, lower feed roll 26 and heating unit 16 to be engaged by the novel friction twister 10 of the instant invention and upper feed roll device 12. Twist is inserted in the strand F in what will be referred to herein as the heating-twisting zone and designated as zone $X^1$. While this term is used for convenience herein, it is to be understood that a cooling zone for the strand exists in zone $X^1$ and commences where the strand exits from heating unit 16. Said zone $X^1$ is deemed to include the apparatus section from lower feed roll 26 up to and including twister 10. The upper feed roll device 12 and lower feed roll 26 are correlated in speed to impart the desired tension in the strand in the zone $X^1$. As the strand leaves the exit end of twister 10 it is in an untwisted state and is directed in this condition to upper feed roll device 12 and ultimately to take-up unit 14.

It is to be understood that only so much of a false twist texturizing machine and its operation has been described herein as is necessary to an understanding of the relationship between such structure and the friction twister of the present invention, and no attempt has been made to define further particulars of the texturizing machine and its operation, reference being at this point directed to the particulars of the specific texturizing apparatus with which the invention might be employed.

In accordance with the present invention, and with reference at this juncture particularly to FIGS. 2–5, the twister 10 of the present invention is mounted on a swing 30 carried on the frame of the texturing machine. The swing is rotatable to move the whorl or cap 32 of a hollow spindle 34 of the twister into and out of engagement with an elongated driving belt 35 which extends the full length of the machine and which is common to all of the spindles on the machine. Thus, swing 30 serves as a suitable locator to situate the spindle 34 in an operable, rotative condition against belt 35 or, on the other hand, to displace the belt from contact with the belt and render the spindle inoperative, i.e., non-rotational, as, for example, when the twister is to be threaded up. Swing 30, by virtue of its mount on the texturing machine (such mount not being illustrated herein) permits spindle 34 to be positioned for driving by either the front or rear side of belt 35. In this way the spindle can be driven in either a left or right sense to thus produce strand having S or Z twist.

Figure 3:
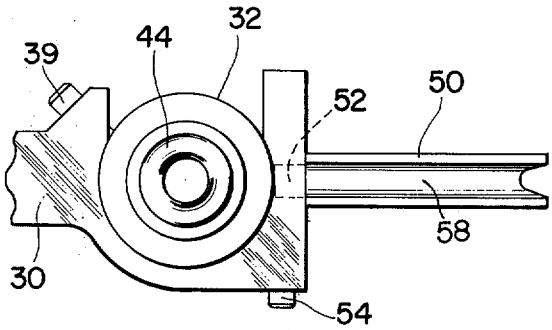
FIG. 3 is a top plan view of the structure of FIG. 2.

It has already been stated that twister 10 includes a hollow spindle 34 and a cap 32. The cap 32 is press-fitted or otherwise tightly secured to the upper end of the spindle and a similar cap 36 is likewise pressed or otherwise tightly secured to the lower end of the spindle. Consequently, caps 32 and 36 together with spindle 34 all rotate as an integral unit. The stationary holder for spindle 34 is constituted as a tubular mount 38 and it is this mount which is secured in swing 30 as by a set screw 39 as seen in FIG. 3. Ball bearings 40 are provided proximate to opposite ends of mount 38 (FIG. 4) for rotatably supporting spindle 34 on the mount and suitable seals 42 are provided adjacent the bearings to retain the lubrication in the bearings as well as to protect them from dust and the like.

Figure 4:
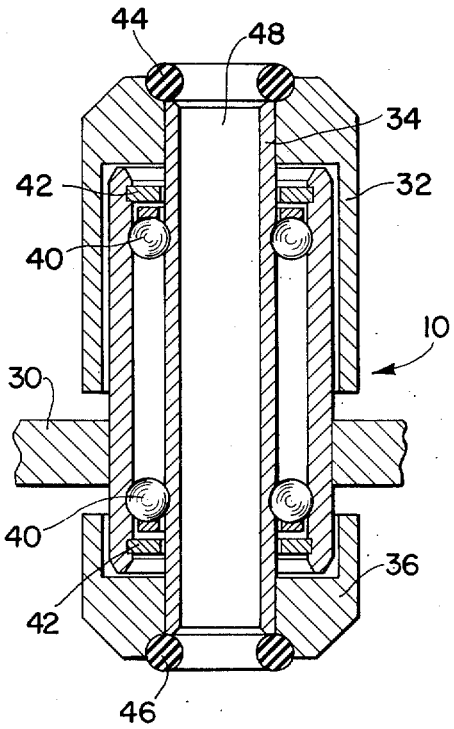
FIG. 4 is a view taken along lines IV—IV of FIG. 2.

As best seen FIG. 4 an elastomeric O-ring or friction member 44 is pressed into a recess formed in cap 32 at the upper end of spindle 34 for firm seating therein. A similar O-ring or friction member 46 is likewise pressed into a further groove in cap 36 at the opposite end of spindle 34. It is to be noted that friction members 44, 46, are firmly seated within respective cap 32, 36 to a depth so that the mid-line of each is recessed below the end wall of its associated cap for rotation therewith. By such seating the friction members are prevented from being pulled out of the spindle during rotation of the spindle and strand twisting. With continuing reference to friction members 44, 46 it is also important to note that each of the friction members have generally convex outer faces which protrude outwardly from the end wall of its associated cap by a substantial distance. Also, it will be observed that the internal diameter of each of the friction members 44, 46 is slightly smaller than the axial bore 48 of spindle 34. Accordingly, and as will be discussed in further detail hereinafter, strand F which is carried through the spindle bore 48 is caused to contact friction members 44, 46 firmly. As a result thereof the strand is twisted in the heating-twisting zone $X^1$ as spindle 34 is rotated.

With attention now particularly to FIGS. 1–3, 5 and 6 a reversing guide 50 is mounted on the end of swing 30 remote from the point of attachment of the swing on the false twisting machine. The mounting means for said guide 50 includes a stud 52 integral with the guide and extending forwardly to engage tightly in a mating hole in the outer end of swing 30. A set screw 54 is threaded through a hole in the side of swing 30 and bears against stud 52 to secure guide 50 in a position with its front wall 56 parallel to the axis of spindle 34 and with a peripheral groove 58 in guide 50 aligned radially with the axis of the spindle. Desirably, groove 58 is covered with a low friction, wear resistant material, such as ceramic coating to thus provide a surface on which the strand may slide as it is conveyed through the twister. With continuing reference to groove 58 it is also to be observed that the terminal ends 59, 60 thereof are provided with radii which cause the groove to be inturned, thereby precluding the strand being drawn over sharp edges at these terminal ends.

Figure 5:
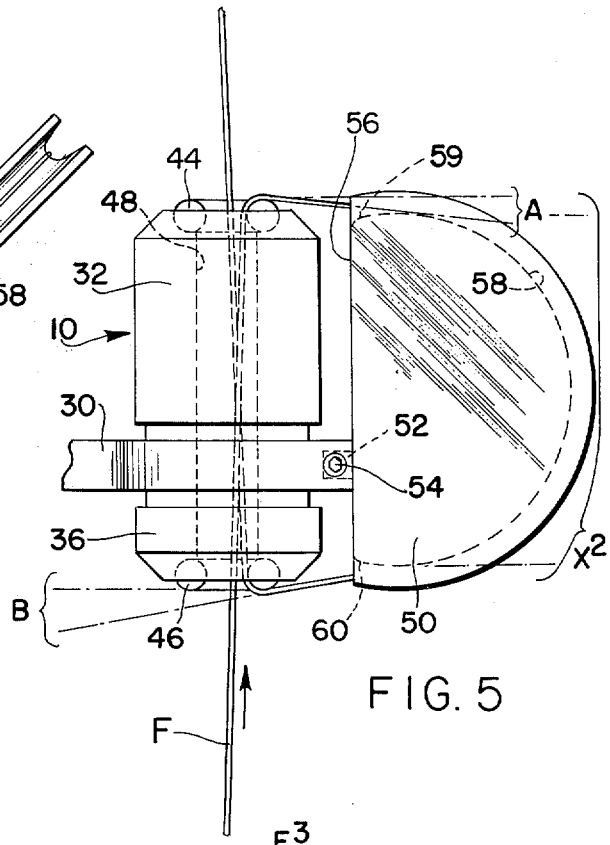
FIG. 5 is a view similar to FIG. 2 showing the strand path through the spindle.

The operation of twister 10 to impart false twist to strand F will be described next. To this end and with reference initially to FIG. 6, strand F is directed in a substantially straight line from heating-twisting zone $X^1$ into the entry end of axial bore 48 of spindle 34, the strand passing essentially centrally through the hole provided in the center of friction member 46 and away from contact with said friction member. At the opposite end of the spindle the strand is drawn angularly over friction member 44 and into groove 58 of reversing guide 50. Consequently, and as best seen in FIG. 5 the strand is inclined in bore 48 relative to the axis of spindle 34. To insure proper frictional engagement of strand F with friction member 44 the strand, as it is drawn around said friction member 44, is deflected in an acute angle as it passes into groove 58. This angle is desirably at least 5° inwardly from a plane normal to the spindle axis and is designated at A in FIG. 5. Strand F then passes through groove 58 ber 46 at an angle B (FIG. 5), this angle B being desirably in the order of 10° to, again, insure proper frictional engagement of the strand with frictional member 46. For convenience of discussion herein the zone through which the strand passes from its contact with friction member 44, through groove 58 and into contact with friction member 46 is designated as zone $X^2$. From its contact line with friction member 46 the strand is again directed axially through spindle 34 and exits through the central aperture in friction member 44, the strand being guided outwardly from its contact line with friction member 46 in a substantially straight line path and devoid of contact with friction member 44. Again here, as mentioned earlier with reference to the path which the strand follows in first entering bore 48, the strand is inclined to the axis of spindle 34 as it advances from member 46 to its exit point. Thus, as seen in FIG. 5, the strand paths cross but the strand does not rub or abrade on itself within bore 48.

Figure 6:
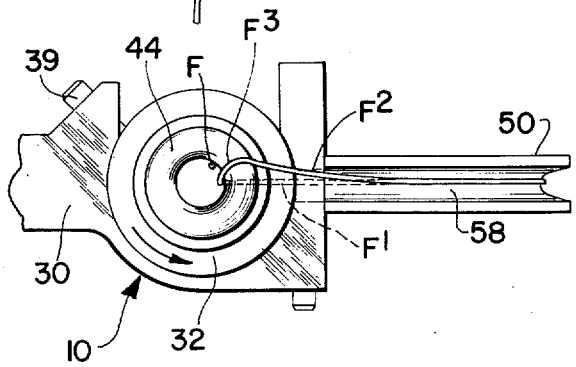
FIG. 6 is a top plan view of the twister illustrating the path assumed by the strand during rotation of the spindle.

It should be borne in mind that the values stated herein for angles A and B are not critical but rather the objective is to insure that adequate frictional engagement of the strand with members 44, 46, is maintained throughout the twisting cycle. In this way the strand F is precluded from significant vibration and prevented from leaving the full control of the friction members during twisting. In keeping with this purpose it has been found that a greater wrap angle of the strand with friction member 46, i.e., angle B, can be provided than at the locus where the strand wraps around friction member 44, i.e., angle A. This is due to the fact that the strand as it is heated, twisted and subsequently cooled below twister 10, is under lighter tension than is the strand when it engages friction member 46. Thus, if the wrap angle of the strand with member 44 is too great the increased friction on the rather lightly tensioned strand will cause the strand to vibrate. Consequently, twist inserted in the strand will be reduced and undesirable chatter marks will be produced in friction member 44 which necessitate more frequent replacement of the O-ring. This vibration is due at least in part to extreme deflection of the path of the strand from the path $F^1$ (FIG. 6) upon rotation of spindle 34. A certain degree of deflection of the strand is acceptable commensurate with the tension in the strand and for present purposes such acceptable deflected path may be considered to be path $F^2$ (FIG. 6). A bend or bight $F^3$ in strand F is formed where the strand engages with the rotating friction member 44. It follows that the greater the wrap angle of the strand with said friction member, the greater will be the friction between friction member 44 and strand F so that the size of bight $F^3$ will increase. As bight $F^3$ increases there is a tendency for the strand to jump between an extreme deflected path downstream of path $F^2$ and a path approaching $F^2$. Therefore, to preclude such extreme deflection of the strand and thus maintain the strand in a path approximating path $F^2$ where it will not jump or vibrate, at least to any consequential degree, the wrap angle of the strand on friction member 44 is held to a lesser value than on friction member 46. As the strand passes through zone $X^2$ tension therein increases due to forces occasioned by the strand contacting member 44 and guide 50. This increase in strand tension coupled with the increased wrap angle B will tend to enlarge the bight that is developed in the strand as it is drawn over rotating friction member 46. This is best seen in FIG. 6 where the strand passing around member 46 is shown in cross-section and depicted as migrating around said member to a greater degree than strand engaged on member 44. The greater development of the bight in the strand on friction member 46 is not detrimental since the increased tension in the strand imparted in zone $X^2$ as just described is adequate to hold the filament in secure engagement with friction member 46.

Another factor to be noted is that the twisting action of friction members 44 and 46 is not additive, that is, one friction member does not impart a given number of turns of twist to the filament, and then the second member adds further turns. Instead, each member cooperates with the other in the impartation of a given number of turns of twist to the filament. Further, it will be apparent that filament F may be twisted by twister 10 to insert either S or Z therein, depending on which side of belt 35 the spindle is driven from and, consequently, in which sense the filament is rotated by the spindle.

Of particular advantage with the twister 10 of the present invention is the fact that the strand is directed into the twister in a subsantially rectilinear path and exits in a similar path. This avoids the necessity of deflecting the strand from its normal course from heating unit 16 in order to enter the spindle and also avoids undesirable further deflection to guide the strand from its exit point with the spindle upwardly to feed roll device 12. Moreover, considering the general vertical orientation of known false twisting texturing apparatuses, the twister is readily adaptable to these known devices without need for costly modifications to amend the existing vertical thread paths of these known apparatuses. Another feature of the present twister resides in the ease of replacement of friction members 44, 46 and, indeed, upon wear being introduced on one side of the friction members, these members can easily be reversed in their respective seats so that the opposing sides of each O-ring can be employed in the twisting operation. Rapid and easy treading-up of the twister of the present invention is a further advantageous feature.

As an example of the number of turns of twist that can be imparted to a strand with the present invention the following case is presented. Rings 44, 46 of twister 10 are provided with each having an inside diameter of 0.328 inch, an outside diameter of 0.702 inch, and a cross-sectional diameter of 0.187 inch. An effective twisting diameter of about four-tenths of an inch is thus provided when the strand is threaded into engagement with friction members 44, 46 through the strand path hereinbefore described. Assume the spindle to be rotated at 20,000 revolutions per minute and 70 denier yarn with a diameter of about 0.045 is being processed. A theoretical spindle-strand ratio of 1:90 is developed and allowing for slippage an actual spindle-yarn ratio of 1:80 may be considered to exist. Consequently, the strand may be advanced at 555 yards per minute while 80 turns per inch of twist is inserted into the strand under the foregoing condition. Thus, it is seen that strand may be advanced through twister 10 at a high rate and substantial turns of twist imparted to the strand while spindle 34 is driven at a relatively low rotational speed.

Figure 7:
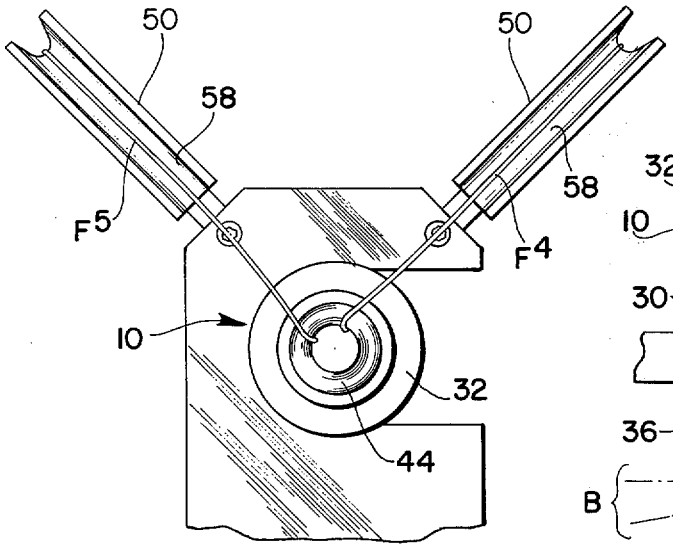
FIG. 7 is a top plan view of a modification of the invention wherein a plurality of strands are simultaneously twisted by a single twister spindle.

In FIG. 7 a modification of twister 10 is shown wherein a plurality of strands $F^4$, $F^5$ are simultaneously twisted with use of a single twister spindle 34. While but two strands are illustrated as being simultaneously twisted in this modified embodiment it will be appreciated that a larger number of strands could be simultaneously twisted, the primary consideration to such increased number being that sufficient space is needed around the wall of spindle 34 to permit the afore-described deflection, i.e., development of bight $F^3$ in each strand, without the thus developed bight in each strand colliding and entangling with any of the other strands being twisted by the common spindle. As illustrated in FIG. 7, a spaced reversing guide 50 of the type already described is provided to direct each strand from friction member 44 at one end of the spindle to friction member 46 at the opposite spindle end.

Since certain changes may be made in the above method and apparatus therefor without departing from the scope of the invention herein involved, it is intended that all matter contained in the above description or shown in the accompanying drawing shall be interpreted as illustrative only and not in a limiting sense.

What is claimed is:

1. A method of processing a strand capable of receiving twist comprising the steps of: providing a rotatable member having spaced apart *ring-like* frictional surfaces thereon, directing said strand in a first path to engage *a first* of said surfaces, directing said strand in a second path to engage a second of said surfaces, rotating said member to thus drive said surfaces and insert twist into said strand, and tensioning said strand during twisting thereof.

2. The method as set forth in claim 1 including the step of tensioning said strand to a first value as it engages said first surface, and tensioning said strand to a second value greater than said first value as it engages said second surface during twisting thereof.

3. The method as set forth in claim 1 wherein the step of directing the strand in said second path includes substantially reversing the direction of travel of the strand from said first path.

4. The method of claim 1 wherein the step of directing the strand in a first path includes moving the strand substantially rectilinearly from a locus remote from said rotatable member into engagement with said first surface, the step of directing the strand in a second path includes reversing the direction of said strand; and including the further step of directing the strand in a third path to remove the strand from engagement with said second surface, said first and third paths being approximately parallel.

5. A method of processing a plurality of strands capable of receiving twist comprising the steps of: providing a rotatable member having spaced apart *ring-like* frictional surfaces thereon, directing each of said strands in a respective first path to engage a first of said surfaces, directing each said strand in a respective second path to engage a second of said surfaces, rotating said member to simultaneously insert twist into each said strand, and tensioning said strands during twisting thereof.

6. The method as set forth in claim 5 including the step of tensioning each said strand to a first value as it engages said first surface, and tensioning said strand to a second value greater than said first value as it engages said second surface during twisting thereof.

7. The method as set forth in claim 5 wherein the step of directing the strands in said second paths includes substantially reversing the direction of travel of each said strand from its respective first path.

8. The method of claim 5 wherein the step of directing each said strand in a first path includes moving the strand substantially rectilinearly from a locus remote from said rotatable member into engagement with said first surface, the step of directing the strand in a second path includes reversing the direction of the said strand; and including the further step of directing the strand in a third path to remove the strand from engagement with said second surface, said first and third paths being approximately parallel.

9. Apparatus for imparting twist to an advancing strand comprising, a rotatable member having spaced apart *ring-like* friction means thereon for engagement with said strand, means guiding said strand in a first path to engage a first of said friction means and guiding said strand in a second path to engage a second of said friction means, and drive means for rotating said member to impart twist to the strand engaged on said first and second friction means.

10. Apparatus as set forth in claim 9 wherein said rotatable member is elongated, and said first friction means is positioned proximate to a first end of said member and said second friction means is positioned proximate to a second end of said member.

11. Apparatus as set forth in claim 9 wherein said guilding means is operable to reverse the direction of advance of said strand in guiding the strand from said first to said second friction means.

12. Apparatus as set forth in claim 9 wherein said rotatable member is a rotatable hollow spindle, said first friction means is positioned proximate a first end of the spindle and said second friction means is positioned proximate a second end of the spindle, the strand during twisting approaching said first friction means in a path leading through said hollow spindle and at an angle to insure frictional engagement of the strand with said first friction means, and said strand being directed by said guide means in a path remote from said hollow spindle and at an angle to insure frictional engagement of the strand with said second friction means.

13. Apparatus as set forth in claim 12 wherein said guide means is operable to substantially reverse the direction of advance of the strand in guiding said strand from said first friction means to said second friction means.

14. Apparatus as set forth in claim 13 wherein said strand is directed in an exit path from said second friction surface which passes through said hollow spindle.

[15. Apparatus as set forth in claim 9 wherein each said friction means is a ring.]

16. Apparatus as set forth in claim 9 wherein said guiding means includes an elongated grooved element having one of its ends situated proximate the first of said friction means and a second of its ends situated proximate the second of said friction means.

17. Apparatus for imparting twist to a plurality of advancing strands comprising, a rotatable member having spaced apart *ring-like* friction means thereon for engagement with each said strand, individual guide means for guiding each said strand in a respective first path to engage a first of said friction means and in a second path to engage a second of said friction means, and drive means for rotating said member to impart twist to each of said strands engaged on said first and second friction means.

18. Apparatus as set forth in claim 17 wherein said rotatable member is elongated, and said first friction means is positioned proximate to a first end of said member and said second friction means is positioned proximate to a second end of said member.

19. Apparatus as set forth in claim 17 wherein said guiding means is operable to reverse the direction of advance of each said strand in guiding the filament from said first to said second friction means.

20. Apparatus as set forth in claim 17 wherein said rotatable member is a rotatable hollow spindle, said first friction means is positioned proximate a first end of the spindle and said second friction means is positioned proximate a second end of the spindle, each said strand during twisting approaching said first friction means in a path leading through said hollow spindle and at an angle to insure frictional engagement of the strand with said first friction means, and each said strand being directed by its respective guide means in a path remote from said hollow spindle and at an angle to insure frictional engagement of each said strand with said second friction means.

21. Apparatus as set forth in claim 20 wherein each said guide means is operable to substantially reverse the direction of advance of each said strand in guiding each said strand from said first friction means to said second friction means.

22. Apparatus as set forth in claim 20 wherein each said strand is directed in an exit path from said second friction surface which passes through said hollow spindle.

23. A method of false twisting a strand comprising the steps of, advancing the strand in a path from a supply and through a heated zone, controlling the tension in said strand during heating thereof in said heated zone, applying a first force to the strand at a first position in said path *by advancing the strand over ring-like means,* applying a second force to said strand at a second position in said path and at a locus upstream of said first force *by advancing the strand over further ring-like means,* said first position and said second position being aligned with each other to be substantially rectilinear with the path through said heated zone and said first and second forces cooperating to twist the strand in the heated zone and to subsequently untwist the strand, and finally collecting the false twisted strand.

24. A method as set forth in claim 23 including the steps of tensioning the strand to a first value as said first force is applied to it, and tensioning the strand to a second value greater than said first value as said second force is applied to it.

25. Apparatus for false twisting an advancing strand drawn from a strand supply comprising, means providing a heated zone for heating the strand to a temperature to set twist in the same, means for controlling strand tension within said heated zone, means for applying a first force on the strand, means for redirecting the advancing strand, and means for applying a second force thereon upstream of said first force, said first and second forces acting to false twist the strand and means for taking up the strand, after false twisting thereof, both said means for applying a first force and means for applying a second force being *ring-like means* carried by a single rotatable member.

26. Apparatus as set forth in claim 25 wherein said rotatable member is hollow, said means for applying said first and second forces are respective first and second friction rings positioned at spaced loci on said member, and said means for redirecting the advancing strand includes guide means for directing the strand from said first ring to said second ring.

27. Apparatus for false twisting an advancing strand drawn from a strand supply comprising, means providing a heated zone for heating the strand to a temperature sufficient to afford molecular reorientation of the molecules of the strand while it is twisted, means for controlling strand tension within said heated zone, spaced apart first and second *ring-like* friction means for engagement with the strand to twist the strand in said heated zone and to untwist the strand after removal from said heated zone, single spindle means for rotating said first and second friction means, guide means operable to direct the strand to the first of said friction means for engagement therewith and thereafter substantially reverse the direction of travel of the strand to the second friction means for engagement therewith, and means for taking-up the strand after false twisting thereof.

28. Apparatus as set forth in claim 27 wherein said friction means includes elastomeric rings having convex surfaces for engagement of the strand, a one of said rings being mounted at each end of said spindle, and said guide means is operative to cause said strand to wrap about a one of said rings to a greater degree than the other of the rings.

References Cited

The following references, cited by the Examiner, are of record in the patented file of this patent or the original patent.

UNITED STATES PATENTS

| | | | |
|---|---|---|---|
| 3,029,591 | 4/1962 | Scragg et al. | 57—77.4 X |
| 3,066,473 | 12/1962 | Maeda | 57—77.4 |
| 3,535,866 | 10/1970 | Tsuruto et al. | 57—77.4 X |
| 3,656,290 | 3/1972 | Kuussaari | 57—77.4 |
| 3,537,250 | 11/1970 | Mackintosh | 57—77.4 |
| 2,936,570 | 5/1960 | Arthur et al. | 57—77.4 |
| 2,936,567 | 5/1960 | Russell et al. | 57—77.4 |
| 2,883,824 | 4/1959 | Andrews et al. | 57—77.45 |

DONALD E. WATKINS, Primary Examiner

U.S. Cl. X.R.

57—34, 157